United States Patent [19]

Motohashi et al.

[11] Patent Number: 4,780,716

[45] Date of Patent: Oct. 25, 1988

[54] SEMICONDUCTOR INTEGRATED SWITCHING APPARATUS

[75] Inventors: Kenichi Motohashi; Masakatsu Higake; Kenzo Harada; Yoshihisa Sakurai; Takao Fukuda, all of Tokyo, Japan

[73] Assignee: NEC Corporation, Tokyo, Japan

[21] Appl. No.: 925,593

[22] Filed: Oct. 31, 1986

[30] Foreign Application Priority Data

Nov. 1, 1985 [JP] Japan .................. 60-246519
Nov. 8, 1985 [JP] Japan .................. 60-250063
Nov. 8, 1985 [JP] Japan .................. 60-250064
Nov. 8, 1985 [JP] Japan .................. 60-250065
Nov. 8, 1985 [JP] Japan .................. 60-250066

[51] Int. Cl.$^4$ .............................................. H04Q 1/00
[52] U.S. Cl. ...................... 340/825.86; 340/825.89; 340/825.91; 379/16
[58] Field of Search ................. 370/63, 64, 59, 58, 370/61, 68, 62, 85, 54; 340/825.61, 825.89, 825.8, 825.91; 379/16

[56] References Cited

U.S. PATENT DOCUMENTS

| | | | |
|---|---|---|---|
| 3,983,330 | 9/1976 | Tongi | 370/63 |
| 4,038,497 | 7/1977 | Collins et al. | 370/54 X |
| 4,074,077 | 2/1978 | Charransol et al. | 370/63 |
| 4,170,718 | 10/1979 | Miyazaki et al. | 370/63 |
| 4,320,501 | 3/1982 | LeDieu et al. | 370/63 |
| 4,524,441 | 6/1985 | Simmons et al. | . |
| 4,524,442 | 6/1985 | Simmons et al. | . |

Primary Examiner—Ulysses Weldon
Attorney, Agent, or Firm—Sughrue, Mion, Zinn, Macpeak & Seas

[57] ABSTRACT

A semiconductor integrated switching apparatus includes a space switch, a control memory, an output control circuit, an expanding circuit, an address comparator, and a maintenance reading circuit, all of which are integrated on a single substrate. The control memory controls switching operation of the space switch. The output control circuit transmits a highway signal selected by the space switch. The expanding circuit expands the capacity of the space switch. The address comparator reads out a written address signal upon writing thereof and compares a readout address signal with the written address signal. The maintenance reading circuit reads out an operation status signal of the space switch.

5 Claims, 8 Drawing Sheets

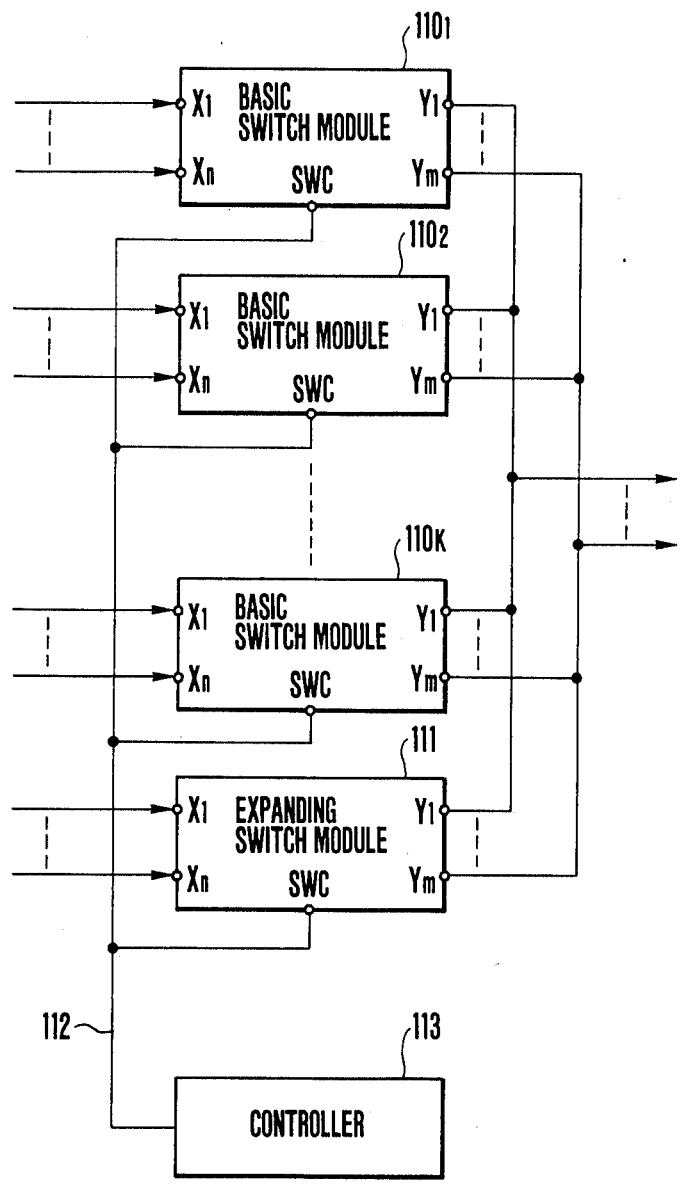
F I G. 5

SEMICONDUCTOR INTEGRATED SWITCHING APPARATUS

BACKGROUND OF THE INVENTION

The present invention relates to a semiconductor integrated switching apparatus.

A semiconductor integrated switching apparatus mainly comprises a space switch for switching highway signals and a control unit for controlling switching of the space switch. Since each peripheral control circuit for controlling the space switch comprises a plurality of semiconductor integrated circuits, the mounting area of the space switch control unit is large. If the control speed of the space switch is increased, the noise margins between the semiconductor integrated circuits are greatly reduced, thus undesirably limiting control speed of the space switch.

SUMMARY OF THE INVENTION

It is, therefore, an object of the present invention to provide a semiconductor integrated switching apparatus capable of eliminating the conventional drawback described above and having a small mounting area to increase the switching speed.

In order to achieve the above object of the present invention, there is provided the semiconductor integrated switching apparatus comprising a space switch, a control memory for controlling the operation of the space switch, a control circuit for transmitting a highway signal selected by the space switch, an expanding circuit for expanding a capacity of the space switch, an address comparator for reading out a written address signal from the control memory upon writing of the address signal and comparing the readout address signal with the written address signal, and a maintenance reading control circuit for reading out an operation status signal of the space switch.

BRIEF DESCRIPTION OF THE DRAWINGS

FIG. 5 is a block diagram of a semiconductor integrated switching apparatus according to still another embodiment of the present invention;

DETAILED DESCRIPTION OF THE PREFERRED EMBODIMENTS

Preferred embodiments of the present invention will be described with reference to the accompanying drawings.

Figure 1:
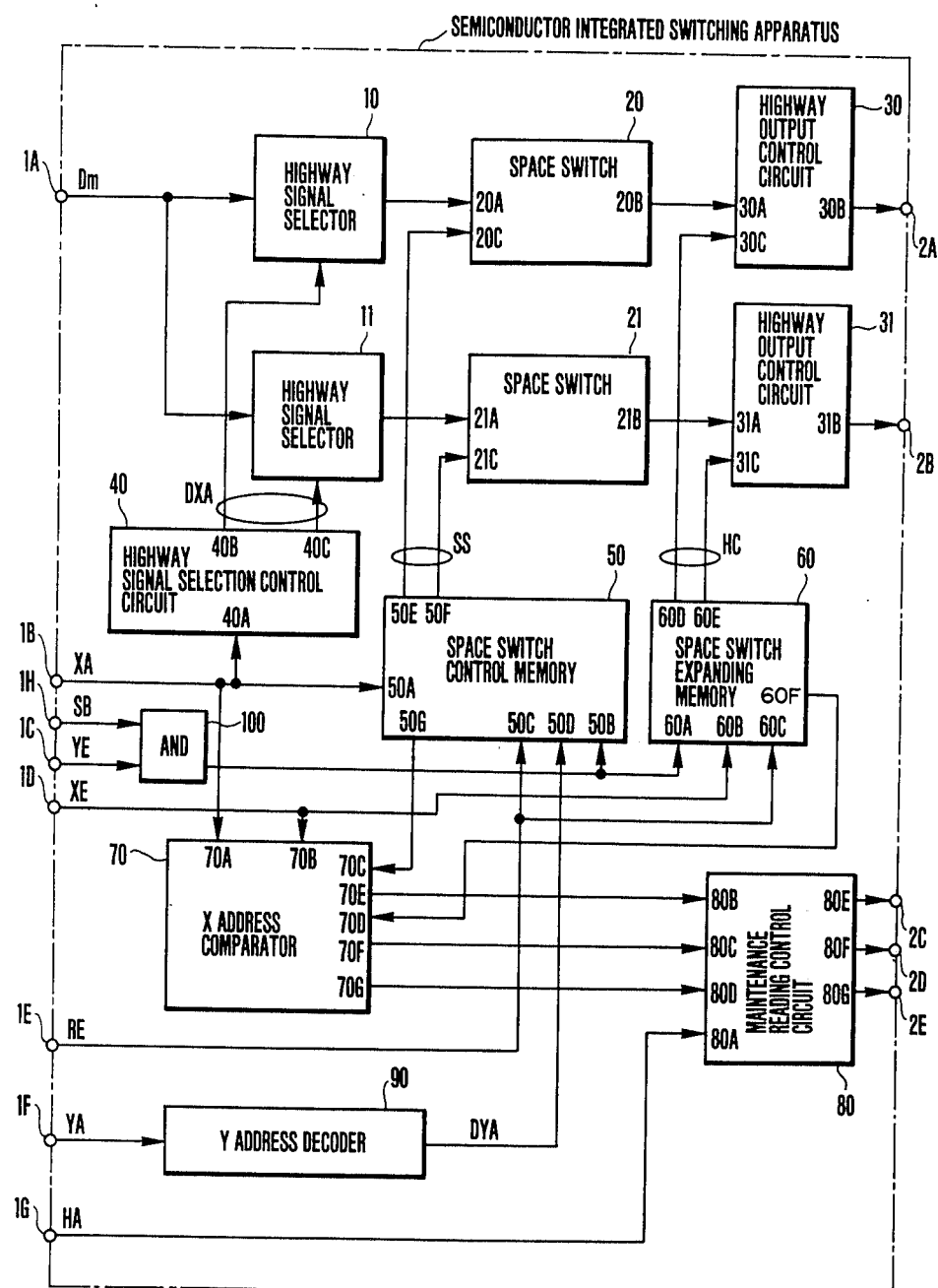
FIG. 1 is a block diagram showing the overall configuration of a semiconductor integrated switching apparatus according to an embodiment of the present invention.

FIG. 1 is a block diagram showing the overall configuration of a semiconductor integrated switching apparatus according to an embodiment of the present invention. The components surrounded by the dotted line are formed on a single semiconductor IC (Integrated Circuit). The switching circuit in FIG. 1 includes an input terminal 1A for receiving a highway signal Dm, an input terminal 1B for receiving an X address signal, an input terminal 1C for receiving a Y address expanding signal YE, an input terminal 1D for receiving an X address expanding signal XE, a reset terminal 1E for receiving a reset signal RE, an input terminal 1F for receiving a Y address signal YA, an input terminal 1G for receiving a maintenance reading control signal HA for reading out the operation status signal of the switching apparatus, an input terminal 1H for receiving a strobe signal SB, output terminals 2A and 2B for outputting a selected highway output signal, and terminals 2C, 2D and 2E at which a maintenance signal appears. The switching apparatus is constituted by a semiconductor IC. The input terminal 1A is connected to the input terminals of highway signal selectors 10 and 11. The output terminals of the highway signal selectors 10 and 11 are respectively connected to input terminals 20A and 21A of space switches 20 and 21. Output terminals 20B and 21B of the space switches 20 and 21 are connected to input terminals 30A and 31A of highway output control circuits 30 and 31, respectively. Output terminals 30B and 31B of the highway output control circuits 30 and 31 are connected to the output terminals 2A and 2B, respectively. The input terminal 1B for receiving the X address signal XA is connected to input terminals 40A, 50A, and 70A of a highway signal selection control circuit 40, a space switch control memory 50, and an X address comparator 70.

The input terminals 1H and 1C for the strobe and Y address expanding signals SB and YE are connected to the input terminals of an AND gate 100. The output terminal of the AND gate 100 is connected to input terminals 50B and 60A of the space switch control memory 50 and a space switch expanding memory 60. The input terminal 1D for receiving the X address expanding signal XE is connected to input terminals 60B and 70B of the space switch expanding memory 60 and the X address comparator 70. The input terminal 1E for the reset signal is connected to reset terminals 50C and 60C of the space switch control memory 50 and the space switch expanding memory 60. The input terminal 1F for the Y address signal is connected to the input terminal of a Y address decoder 90. The output terminal of the Y address decoder 90 is connected to an input terminal 50D of the space switch control memory 50. The input terminal 1G for the maintenance reading control signal HA is connected to an input terminal 80A of a maintenance reading control circuit 80. Output terminals 40B and 40C of the highway signal selection control circuit 40 are respectively connected to the control terminals of the highway signal selectors 10 and 11. Output terminals 50E and 50F of the space switch control memory 50 are connected to input terminals 20C and 21C of the space switches 20 and 21, respectively. Output terminals 60D and 60E of the space switch expanding memory 60 are connected to input terminals 30C and 31C of the highway output control circuits 30 and 31, respectively.

Output terminals 50G and 60F of the space switch control memory 50 and the space switch expanding memory 60 are connected to input terminals 70C and 70D of the X address comparator 70, respectively. Three output terminals 70E, 70F, and 70G of the X address comparator 70 are connected to input terminals 80B, 80C, and 80D of the maintenance reading control circuit 80, respectively. Output terminals 80E, 80F, and 80G corresponding to the input terminals 80B, 80C, and 80D of the maintenance reading control circuit 80 are connected to the output terminals 2C, 2D, and 2E, respectively.

The operation of the semiconductor integrated switching apparatus in FIG. 1 will be described below.

The highway signal Dm, is supplied to the highway signal selectors 10 and 11 through the input highway terminal 1A. The X address signal XA is supplied to the highway signal selection control circuit 40 through the X address input terminal 1B. The highway signal Dm representing a highway selected by an X address signal DXA decoded by the highway signal selection control circuit 40 is supplied from one of the highway signal selectors 10 and 11 to a corresponding one of the space switches 20 and 21. The X address signal XA is also supplied to the space switch control memory 50. The Y address signal YA is supplied from the input terminal 1F to the Y address decoder 90. A Y address signal DYA decoded by the Y address decoder 90 is supplied to the space switch control memory 50. Through the space switch 20 or 21 selected by a space switch operation control signal SS supplied from the output terminal 50E or 50F of the space switch control memory 50, the highway signal is supplied to one of the highway control circuits 30 and 31. The X address comparator 70 compares the X address signal XA with the X address signal written in the space switch control memory 50 and supplies a comparison result to the maintenance reading control circuit 80. The X address expansion signal XE from the input terminal 1D is compared by the comparator 70 with the X address expansion signal written in the space switch expanding memory 60. The comparison result is also supplied to the maintenance reading control circuit 80. The maintenance reading control circuit 80 supplies the input signals to the maintenance reading terminals 2C, 2D, and 2E in response to the maintenance reading control signal HA input through the maintenance reading input terminal 1G. The strobe signal SB input to the input terminal 1H and the Y address expanding signal YE input to the input terminal 1C are input to the AND gate 100. An output from the AND gate 100 serves as a write signal for the space switch control memory 50 and the space switch expanding memory 60. The highway output control circuits 30 and 31 send the highway input signals Dm to the highway output terminals 2A and 2B in response to the highway output control signal HC supplied from the space switch expanding memory 60. The space switch control memory 50 and the space switch expanding memory 60 are reset in response to the reset signal RE supplied from the reset terminal 1E.

The above components are formed on an IC according to currently used semiconductor IC techniques.

According to this embodiment described above, since the space switches and the space switch control memories are formed on a single IC, the mounting area of the space switch control memories can be greatly reduced, thereby increasing the noise margins between the control memories and hence achieving high-speed switching.

Figure 2:
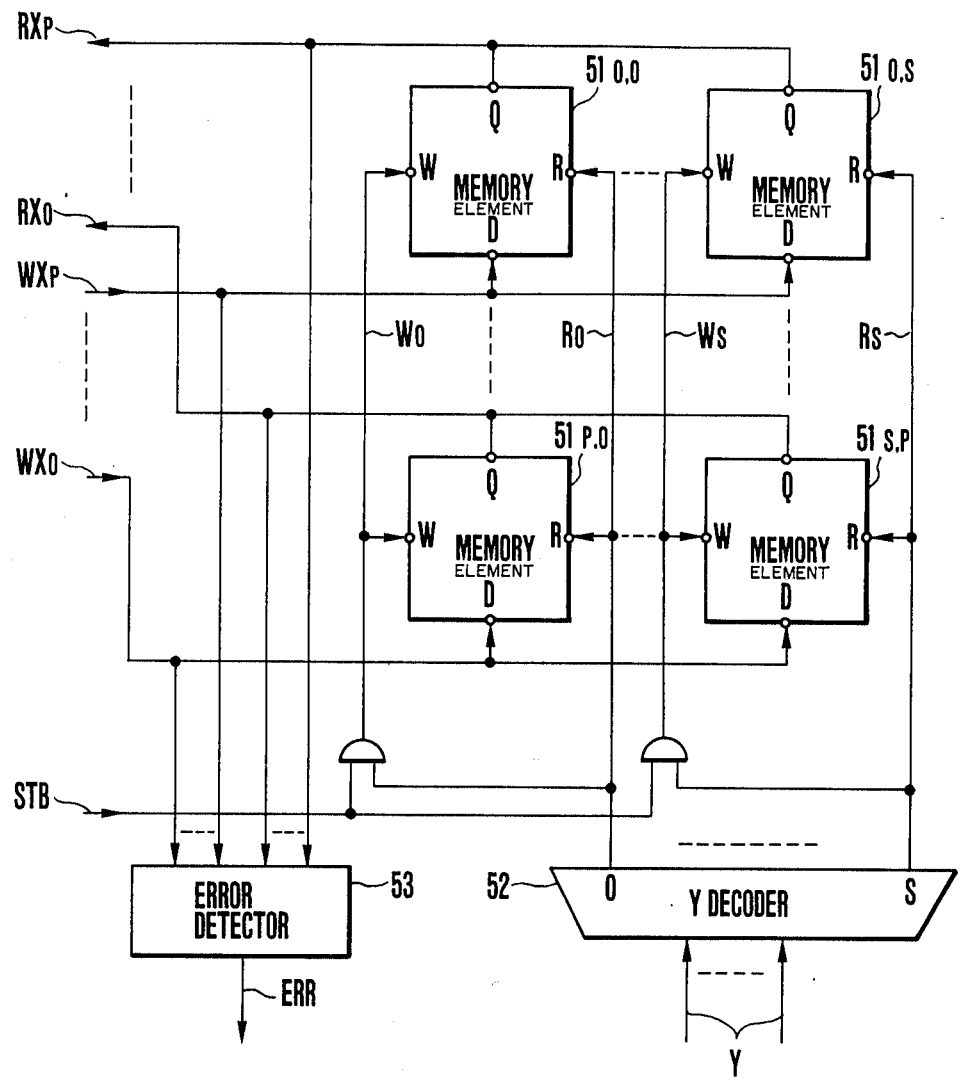
FIG. 2 is a block diagram of a space switch control memory in FIG. 1.

FIG. 2 is a block diagram of the space switch control memory 50 shown in FIG. 1. In a conventional memory device, a parity bit is added to the write data, and the parity bit is checked in the read mode so as to detect a write error. In the conventional arrangement, a redundancy memory element is required since the parity bit is used. In addition, error detection is inevitably delayed in the read mode. The space switch control memory 50 in FIG. 2 solves the above problem. The write and read addresses are simultaneously accessed to read out the specified data from the read data terminal of the memory element. The readout data is compared with the written data.

Referring to FIG. 2, reference numerals $51_{0,0}$ to $51_{S,P}$ are memory elements of $(P+1)$ rows and $(S+1)$ columns. One of the 0th to Sth columns is selected in response to the output from a Y decoder 52. Reference symbols $R_0$ to $R_S$ denote read address signal lines each connected to read address signal terminals R of the memory elements 51 of a corresponding column. Reference symbols $W_0$ to $W_S$ denote write address signal lines each connected to row write address signal terminals W of the memory elements 51 of a corresponding column and receiving an AND output of a corresponding output from the Y decoder 52 and the write strobe signal received through a write strobe signal line STB. Reference numerals $WX_0$ to $WX_P$ denote X address signal lines also serving as write data lines, each connected to column write data terminals D of the memory elements of a corresponding row. Reference numerals $RX_0$ to $RX_P$ denote read data lines each connected to read data terminals Q of the memory elements of a corresponding row. The write data lines $WX_0$ to $WX_P$ and the read data lines $RX_0$ to $RX_P$ are connected to an error detector 53. A Y address signal Y is decoded by the decoder 52 to select one of the read address signal lines $R_0$ to $R_S$. The contents of the memory elements of the selected column are read out onto the read data lines $RX_0$ to $RX_P$. In the write mode, one of the X address signal lines (write data lines) $W_X$ to $WX_P$ is selected while the Y address signal Y is applied to the memory elements, thereby applying the write data to the specified one row of memory elements, while the strobe signal is applied onto the strobe signal line STB, thereby writing the data in any one of the memory elements. The written data is immediately read out onto one of the read data lines $RX_0$ to $RX_P$. The error detector 53 which has received the signals from the write data lines $WX_0$ to $WX_P$ and the read data lines $RX_0$ to $RX_P$ compares the written and the readout data. If a noncoincidence occurs between the written and readout signals, the error detector 53 outputs an error signal ERR. Each of the memory elements $51_{0,0}$ to $51_{S,P}$ comprises, for example, a flip-flop.

According to the embodiment described above, data writing of the memory element is performed simultaneously with data reading, and the written and the readout data are compared. Therefore, an additional memory element for the parity bit can be omitted to eliminate an economical disadvantage, and at the same time, the write errors of the memory elements can be immediately detected.

Figure 3:
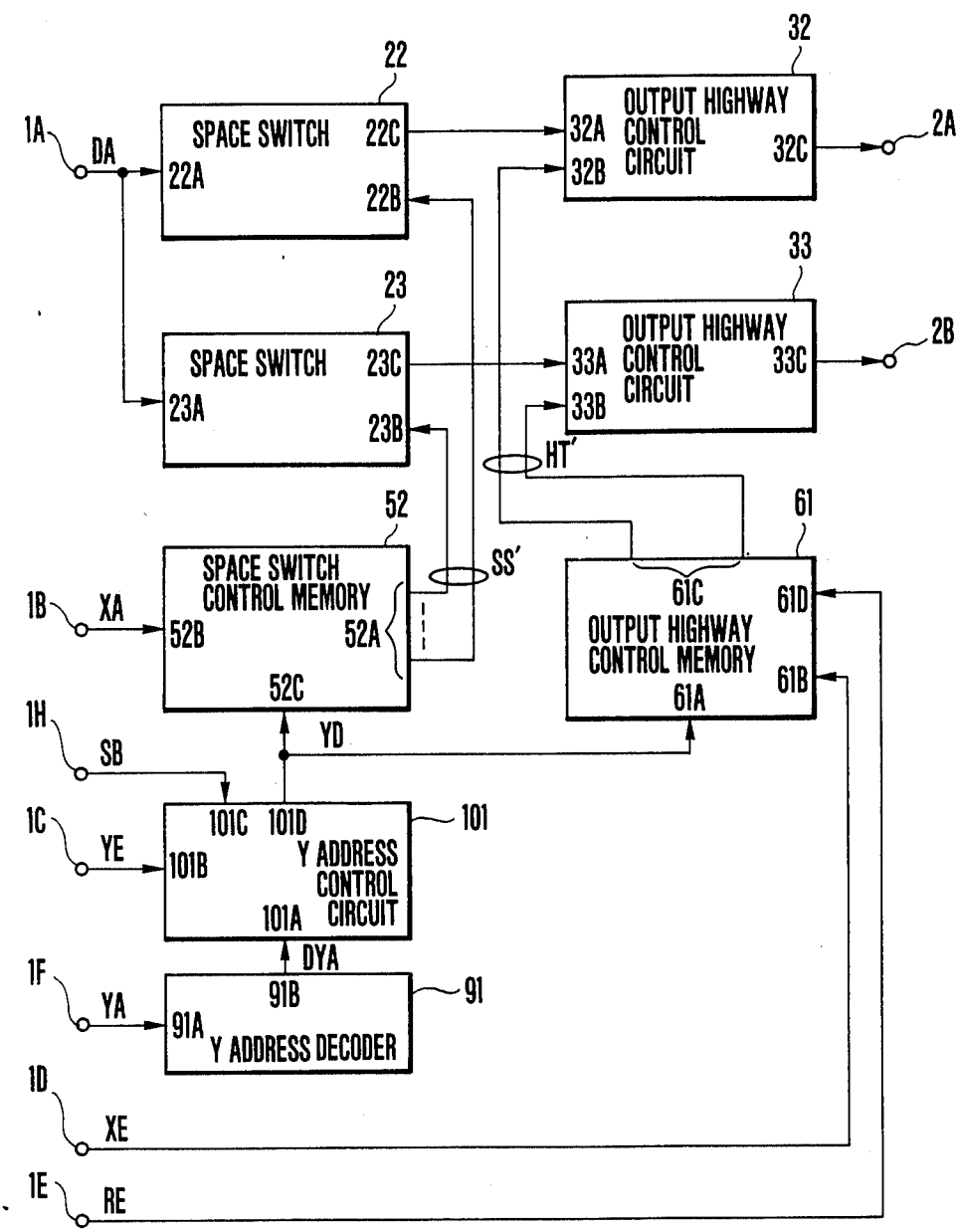
FIG. 3 is a block diagram showing the overall configuration of a semiconductor intergrated switching apparatus according to another embodiment of the present invention.

FIG. 3 is a block diagram of an expanding system of the space switching apparatus in FIG. 1 according to another embodiment of the present invention.

In this embodiment, the apparatus includes space switches 22 and 23, output highway control circuits 32 and 33, a space switch control memory 52, an output highway control memory 61, a Y address control circuit 101, and a Y address decoder 91. The space switches (i.e., each switch of 32×32 switching points) 22 and 23 respectively comprise input terminals 22A and 23A for receiving a highway signal DA through input highway terminals (32 bits) 1A, input terminals 22B and 23B for receiving a space switch control signal SS' sent from output terminals (32 bits) 52A of the space switch control memory 52, and output terminals 22C and 23C for sending to the output highway control circuits 32 and 33 the highway signal DA selected in response to the space switch control signal SS'. The Y address decoder 91 comprises an input signal 91A for receiving a Y address signal YA, and output terminals (32 bits) 91B for sending out a decoded Y address signal DYA. The Y address control circuit 101 comprises an input terminal 101A for receiving the decoded Y address signal DYA, an input terminal 101C for receiving a strobe signal SB from an input terminal 1H, and an input terminal 101B for receiving the Y address expanding signal YE through the input terminal 1C. The Y address control circuit 101 comprises an output terminal 101D for sending out Y address memory data YD which is controlled by the logical AND signal of the strobe signal SB and the Y address expanding signal YE.

The space switch control memory 52 comprises an input terminal 52C for receiving Y address memory data YD, and an input terminal 52B for receiving an X address signal XA supplied through the input terminal 1B. The space switch control memory 52 generates the space switch control circuit SS' from the X address signal XA and the Y address memory data YD. The output highway control memory 61 comprises an input terminal 61A for receiving the Y address memory data YD, an input terminal 61B for receiving an X address expanding signal XE, output terminals (32 bits) 61C for sending out an output terminal control signal HT' on the basis of the Y address memory data YD and the X address expanding signal XE, and an input terminal 61D for receiving a reset signal RE. The output highway control circuits 32 and 33 respectively comprise input terminals 32A and 33A for receiving the highway signals DA from the output terminals 22C and 23C of the space switches 22 and 23, input terminals 32B and 33B for receiving highway output terminal control signals sent from the output terminals 61C of the output highway control memory 61, and output terminals 32C and 33C for sending out the highway signals controlled by the highway output control signal HT' to the highway output terminals 2A and 2B.

The operation of the space switch expanding operation in FIG. 3 will be described in detail below.

The Y address expanding signal YE is supplied to the input terminal 61A of the output highway control memory 61 through the Y address control circuit 101 and serves as a switching signal for setting the highway output terminals 2A and 2B in the selection or nonselection mode. The X address expanding signals XE serves as a selection signal for selecting one of the output terminals 2A and 2B in the selection mode of the Y address expanding signal YE. The mode status is stored in a memory having X and Y addresses in the output highway control memory 61. When the AND product of the strobe signal SB and the Y address expanding signal YE is set at logic "1", the addresses of this memory can be updated. The contents of this memory can be cleared in response to a reset signal RE, so that the selection mode is initiated.

Figure 4:
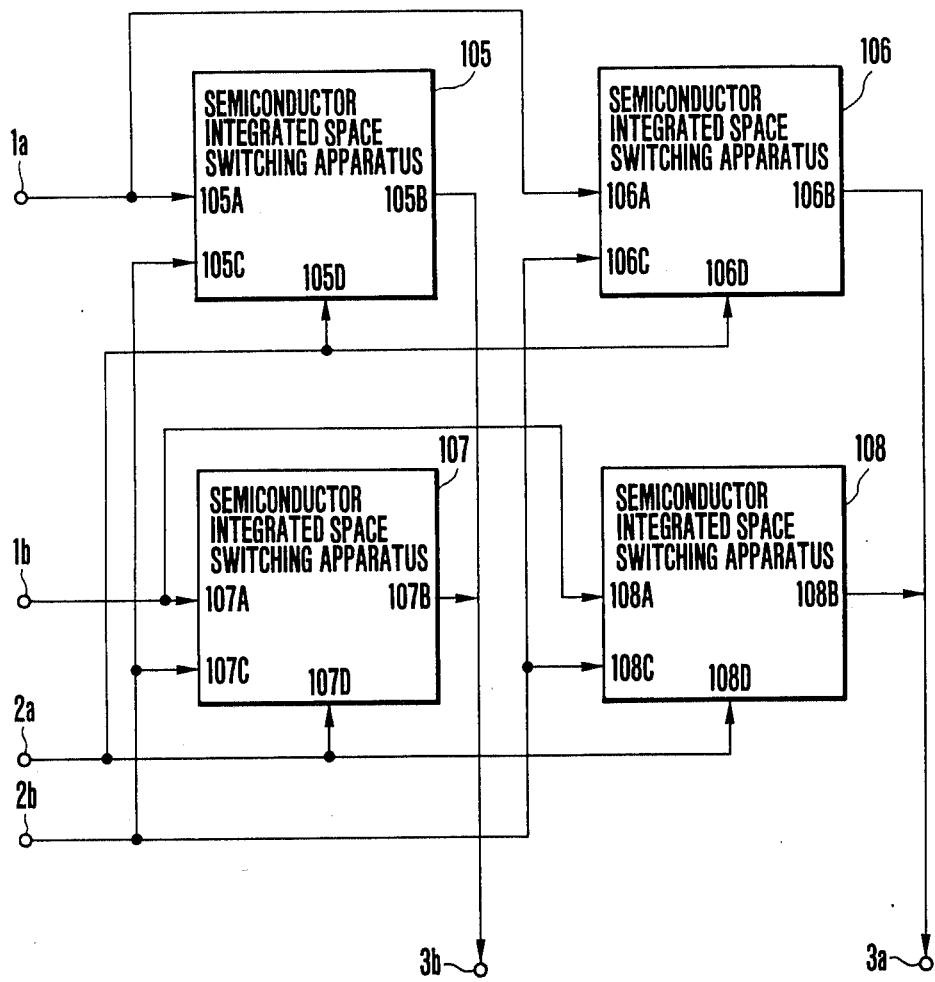
FIG. 4 is a block diagram showing an expanding arrangement of the apparatus in FIG. 3.

FIG. 4 is a block diagram showing an expansion arrangement of a space switch having 32×32 switching points, as described in FIG. 3. In this arrangement, four semiconductor integrated switching apparatuses 105, 106, 107, and 108 each having 32×32 switching points are connected, and a highway input terminal 1a is connected to input terminals 105A and 106A of the switching apparatuses 105 and 106. A highway input terminal 1b is connected to input terminals 107A and 108A of the integrated switching apparatuses 107 and 108. An X address expanding terminal 2a is connected to Y address expanding input terminals 105D, 106D, 107D, and 108D of the switching apparatuses 105, 106, 107, and 108. A Y address expanding terminal 2b is connected to X address expanding input terminals 105C, 106C, 107C, and 108C of the switching apparatuses 105, 106, 107, and 108. Highway output terminals 105B and 107B of the switching apparatuses 105 and 107 are connected to a highway output terminal 3b, and output terminals 106B and 108B of the switching apparatuses 106 and 108 are connected to a highway output terminal 3a, thereby constituting a complete switching arrangement having 64×64 switching points.

In the above embodiment, the switching apparatus has 32×32 switching points, and the switching arrangement comprising four switching apparatuses has 64×64 switching points. However, the number of switching points can be arbitrarily varied.

Since the expanding memory is incorporated in the semiconductor integrated switching apparatus, the space switches can be expanded from an incomplete switching arrangement to a complete switching arrangement. In particular, the switches can be expanded regardless of the complete switching arrangement and the switching capacity.

FIG. 5 shows still another embodiment of the semiconductor integrated switching apparatus. Referring to FIG. 5, the apparatus comprises K basic switch modules $110_1$ to $110_k$, one expanding switch module 111, and a controller 113 connected to the switch modules $110_1$ to $110_k$ and 111 through a bus 112. Each of the switch modules $110_1$ to $110_k$ and 111 comprises n independent input terminals $X_1$ to $X_n$, m output terminals $Y_1$ to $Y_m$ (the identical output terminals of the switching modules $110_1$ to $110_k$ and 111 are commonly connected), and a control signal input terminal SWC. In other words, the switching apparatus in FIG. 5 has a switching capacity of n·(K+1)·m. The control signal input terminal SWC of each switch module is connected to the controller 113 through the bus 112.

Figure 6:
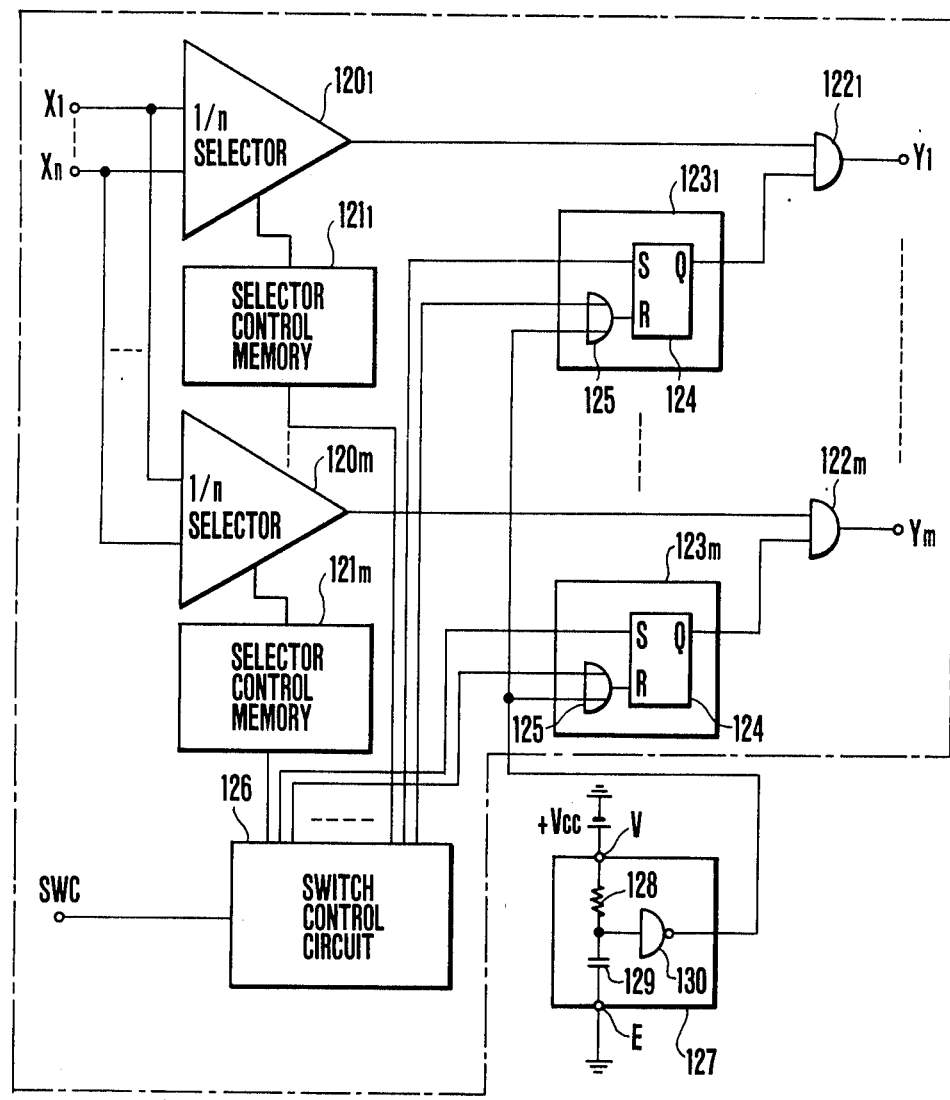
FIG. 6 is a circuit diagram of a basic switch module shown in FIG. 5.

FIG. 6 shows one of the basic and expanding switch modules $110_1$ to $110_k$ and 111 in FIG. 5. Referring to FIG. 6, the switch module comprises m 1/n selectors commonly connected to the n input terminals $X_1$ to $X_n$ and m selector control memories $121_1$ to $121_m$ respectively corresponding to the 1/n selectors $120_1$ to $120_m$. Each of the selector control memories $121_1$ to $121_m$ stores data representing which one of the n input terminals $X_1$ to $X_n$ is selected. The 1/n selectors $120_1$ to $120_m$ and the corresponding selector control memories $121_1$ to $121_m$ constitute a 1/n selector unit for selectively outputting signals (a digital speech signal or the like) supplied to the n input terminals $X_1$ to $X_n$.

Each output signal from the 1/n selectors $120_1$ to $120_m$ is connected to one input terminal of a corresponding one of m AND gates $122_1$ to $122_m$ respectively connected to m output terminals $Y_1$ to $Y_m$. The other input terminal of each of the AND gates $122_1$ to $122_m$ is connected to an output terminal of a corresponding one of m output gate control memories $123_1$ to $123_m$. The AND gates $122_1$ to $122_m$ and the corresponding output gate control memories $123_1$ to $123_m$ constitute an output gate array. Each of the output gate control memories $123_1$ to $123_m$ comprises a flip-flop 124 and an OR gate 125 to control the ON/-OFF operation of the corresponding output gate circuits $122_l$ to $122_m$.

The Q output terminal of the flip-flop 124 of each one of the output gate control memories $123_l$ to $123_m$ is connected to the output terminal of the corresponding output gate control memory. A set terminal S of the flip-flop 124 is connected to the corresponding output terminal of the switch control circuit 126, and a reset terminal R of the flip-flop 124 is connected to the output terminal of an OR gate 125. One input terminal of the OR gate 125 is connected to the corresponding output terminal of the switch control circuit 126, and the other input terminal is commonly connected to the output terminal of a reset circuit 127. The switch control circuit 126 is controlled by the controller 113 (FIG. 5) connected to the control signal input terminal SWC through the bus 112 not to simultaneously use the output terminal used by any one of other switch modules.

The reset circuit 127 comprises a resistor 128 and a capacitor 129, both of which are connected in series between a power source terminal V and a ground terminal E, and a NAND gate 130, the input terminal of which is connected to the joint between the resistor 128 and the capacitor 129 and the output terminal of which is connected to the output terminal of the reset circuit 127.

In the expansion mode, when the expanding switch module 111 is mounted in the switching apparatus in FIG. 5, a power source $+V_{CC}$ is connected to the reset circuit 127. While the capacitor 129 in the reset circuit 127 is charged, a reset signal of logic "1" is supplied from the NAND gate 130 to the OR gates 125 of the output gate control memories $123_1$ to $123_m$. In response to this reset signal, the flip-flops 124 in the output gate control memories $123_1$ to $123_m$ are simultaneously reset, so that the AND gates $122_1$ to $122_m$ are turned off. Therefore, a signal causing the operation error is not supplied from the expanding switch module to the output terminals $Y_1$ to $Y_m$ of the other multiple-connected operating switch modules. When the capacitor 129 of the reset circuit 127 is completely charged, the NAND gate 130 gates a logic "0". As a result, the reset mode of the output gate control memories $123_1$ to $123_m$ is released.

As is apparent from the operation of the reset circuit 127 as described above, although the reset circuits 127 may be arranged in both the basic and expanding switch modules so as to achieve normal operation, the reset circuit 127 need not be arranged in each basic switch module. Therefore, the basic switch module may be arranged by the portion surrounded by the alternate long and short dashed line of FIG. 6. In this case, the OR gates 125 in the output control memories $123_1$ to $123_m$ in the basic module may be omitted. In addition, in the initialization in response to a command from the controller 113 (FIG. 5), the compulsory reset signal from the switch control circuit 126 is directly input to the reset terminal R of each flip-flop 124.

According to this embodiment, when the expanding switch module is multiple-connected to the plurality of output terminals of the basic switch module, a means (i.e., the reset circuit) for automatically sending a reset signal to the plurality of output gate array of the expanding switch module is arranged therein. The switch modules can be expanded without influencing the currently operated basic modules.

Figure 7:
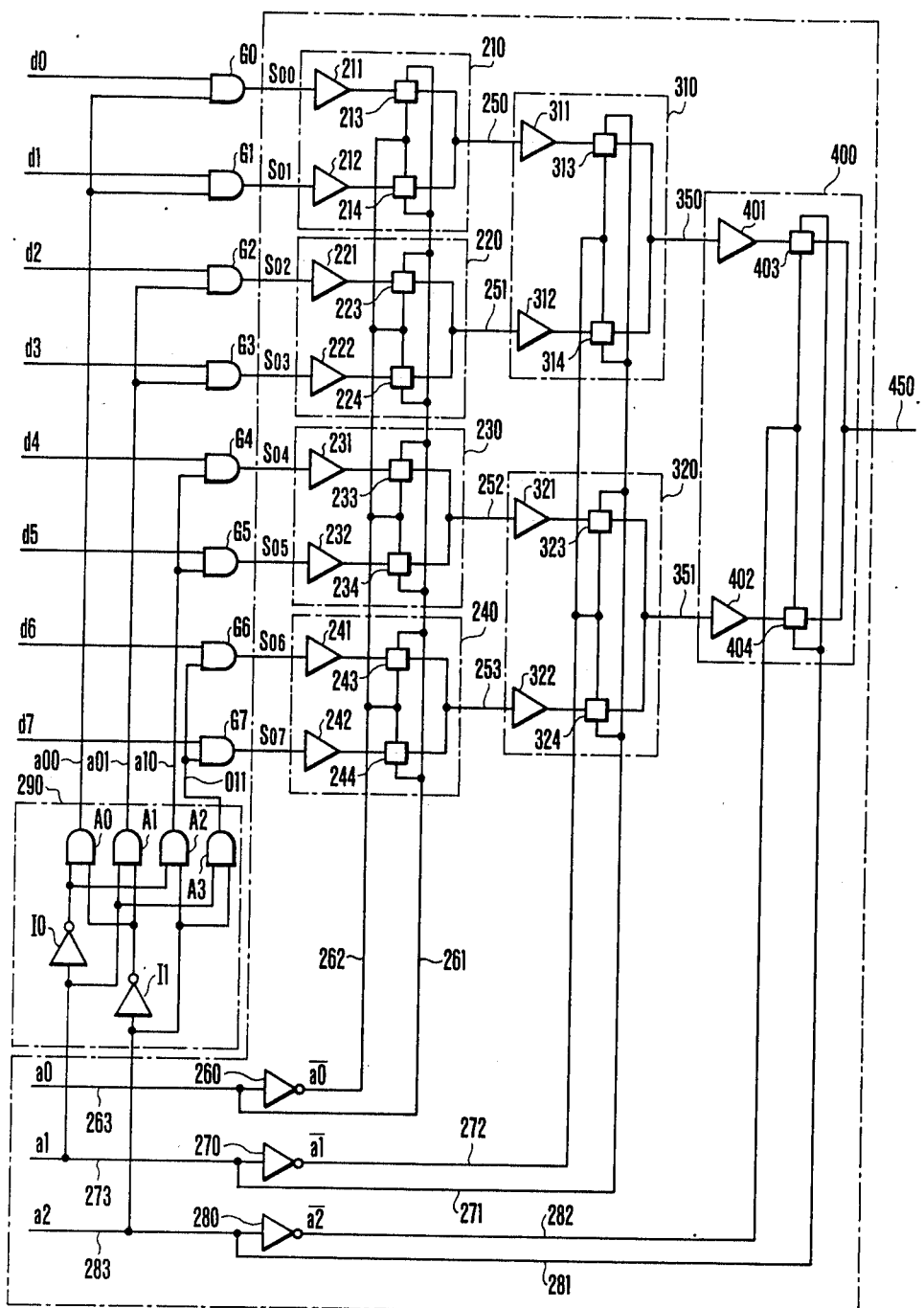
FIG. 7 is a circuit diagram of a highway signal selector in FIG. 1.
Figure 8:
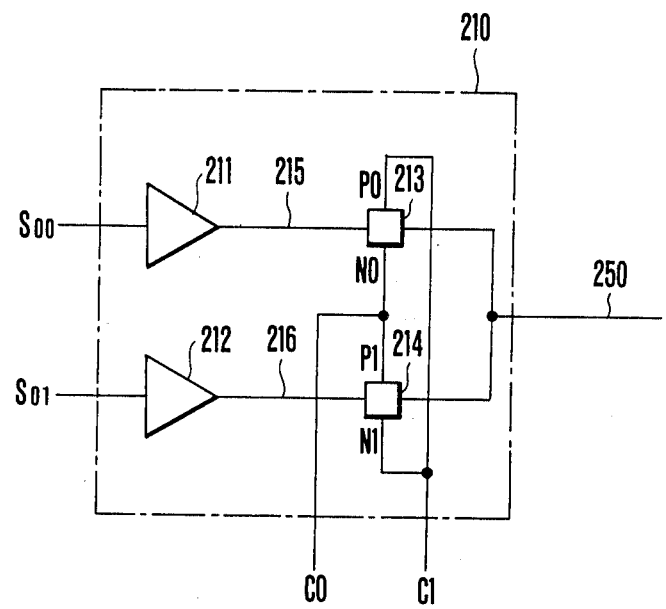
FIG. 8 is a circuit diagram for explaining a basic selector.

FIG. 7 is a circuit diagram of a signal selector suitably used in the highway signal selection control circuit 40 in FIG. 1. Referring to FIG. 7, circuits 210, 220, 230, 240, 310, 320, and 400 have an identical arrangement called a basic selector. The basic selector will be described below. FIG. 8 is a typical example of a basic selector 210.

Referring to FIG. 8, reference numerals 211 and 212 denote 1-input AND gates; and 213 and 214, CMOS transfer gates, respectively. Reference symbols P0 and P1 denote p-channel MOS transistors (to be referred to as PMOSs hereinafter); and N0 and N1, n-channel MOS transistors (to be referred to as NMOSs hereinafter), respectively. The CMOS transfer gate 213 is constituted by connecting the sources and drains of the PMOS P0 and the NMOS N0. The CMOS transfer gate 214 is constituted by connecting the sources and drains of the PMOS P1 and the NMOS N1. The outputs from the transfer gates 213 and 214 are commonly connected to an output line 250.

Inputs S00 and S01 are transmitted to the transfer gates 213 and 214 through the AND gates 211 and 212, respectively. Control inputs C0 and C1 are respectively supplied to the transfer gates 213 and 214. If the control input C0 is logic "one" ("1"), and the control input C1 is logic "zero" ("0"), the transfer gate 213 is turned on to send the output from the AND gate 211 to the output terminal 250. However, if the control input C0 is a logic "0" and the control input C1 is a logic "1", the transfer gate 214 is turned on, and the signal from the AND gate 214 is sent to the output terminal 250. In this manner, the basic selector 210 selects one of the input signals S00 and S01, and the selected input is sent to the output terminal 250. The arrangements and operations of other basic selectors 220, 230, 240, 310, 320, and 400 are identical to those of the basic selector 210 described above.

Referring to FIG. 7, the basic selectors 210, 220, 230, and 240 constitute the first stage of the circuit. The basic selector 210 has two inputs S00 and S01; 220 has S02 and S03; 230 has S04 and S05; and 240 has S06 and S07. The selectors 210, 220, 230, and 240 respectively have output lines 250, 251, 252, and 253. The basic selectors 310 and 320 constitute the second stage. The two input terminals of each of the basic selectors 310 and 320 are connected to the output terminals of the corresponding two basic selectors of the first stage. The basic selectors 310 and 320 of the second stage respectively have output lines 350 and 351. The output lines 350 and 351 are connected to AND gates 401 and 402 in the basic selector 400 of the output stage. The basic selector 400 is connected to one output line 450.

Reference numerals a0, a1, and a2 are control signals of the basic selectors of the first, second and output stages. The control signal a0 is directly input to the basic selectors 210, 220, 230, and 240 of the first stage through a line 261 and is inverted by an inverter 260, and the inverted signal is sent thereto through a line 262 (the noninverted and inverted signals corresponding to the control signals C0 and C1 in FIG. 8). The control signal a1 is directly sent to the basic selectors 310 and 320 through a line 271 and is inverted by an inverter 270 and the inverted signal is supplied thereto through a line 272. The control signal a2 is directly supplied to the basic selector 400 of the output stage through a line 281 and is inverted by an inverter 280 and the inverted signal is supplied thereto through a line 282. More specifically, if the control signal a0 is a logic "1", the basic selectors 210, 220, 230, and 240 output the input signals S01, S03, S05, and S07 onto the output lines 250, 251, 252, and 253. If the control signal a0 is a logic "0", the input signals S00, S02, S04, and S06 appear on the output lines 250, 251, 252, and 253, respectively.

If the control signal a1 is a logic "1", input signals to the AND gates 312 and 322 in the basic selectors 310 and 320 are output onto the output lines 350 and 351, respectively. However, if the control signal a1 is a logic "0", the input signals to the AND gates 311 and 321 appear onto the output lines 350 and 351, respectively.

If the control signal a2 is a logic "1", a signal input to the basic selector 400 through the input line 351 appears at the output line 450. However, if the input signal a2 is a logic "0", the input signal from the input line 350 is output onto the output line 450. The signal selector circuit (the portion surrounded by the alternate long and short dashed line of FIG. 7) consisting of the basic selectors 210, 220, 230, 240, 310, 320, and 400, the inverters 260, 270, and 280, and the lines 261, 262, 271, 272, 281, and 283 has the same arrangement as that of the conventional selector.

However, in the conventional signal selector circuit, since all input signals are applied to the basic selectors 210 and 400 constituted by CMOS transistors, power consumption caused by a parasitic capacitance of each basic selector is undesirably increased.

The portion surrounded by the alternate long and short dashed line has the following power consumption. Assume that the input capacitances of the gates 211 and 212 of the basic selector are $C_0$ each, that capacitances of nodes 215 and 216 are $C_1$ each, and that the capacitance of a node 250 is $C_2$. By these definitions, the power consumption of the CMOS is $fCV^2$ where f is the operating frequency, V is the power source voltage, and C is the total capacitance.

In the basic selector in FIG. 8, if an input having a frequency f is added to the inputs S00 and S01, the power consumption is $f \cdot (2C_0 + 2C_1 + C_2)V^2$. If the input having the frequency f is added to the inputs S00 to S07 in the selector surrounded by the alternate long and short dashed line of FIG. 7, total power consumption is a product of power consumption of each basic selector and the number of basic selectors, i.e., $$7 \cdot f \cdot (2C_0 + 2C_1 + C_2)V^2 = f(14C_0 14C_1 + 7C_0)v^2$$

In the signal selector of the embodiment of FIG. 7, the gates respectively connected to the sources of the CMOS transistors of the first stage are controlled in response to the selection signals supplied to the second and subsequent stages. The input signals which are not selected in the second and subsequent stages are not input to the first stage, thereby reducing the parasitic capacitance and hence power consumption.

Referring to FIG. 7, reference symbols $I_0$ and $I_1$ denote inverters, respectively; and $A_0$ to $A_3$, 2-input AND gates, respectively. The inverters $I_0$ and $I_1$ and the 2-input AND gates $A_0$ to $A_3$ constitute a decoder 290 for decoding the inputs a1 and a2 and setting one of the outputs a00, a01, a10, and a11 to be a logic "1". Reference symbols $G_0$ to $G_7$ denote 2-input AND gates controlled by the outputs a00 to a11 from the decoder 290 to constitute a gate array for clamping the inputs so as to prevent the nonselection input signal from being supplied to the selector circuit consisting of the basic selectors 210 to 240, 310, 320, and 400. For example, if a0=a1=a2="1" is established, only the output a11 from the decoder 290 is set to be "1", and only the inputs d6 and d7 serve as inputs S06 and S07 of the selector circuit. Other inputs d0 to d5 are blocked by the AND gates $G_0$ to $G_5$, so that the inputs S00 to S05 are kept to be "0". Since a0=a1=a2="1" is established, only the input S07 is transmitted to the selector circuit through the lines 253, 351, and 450. If the input capacitance of each of the AND gates $G_0$ to $G_7$ is defined as $C_3$, the capacitance associated with the power consumption is a sum of the input capacitance, i.e., $8 \times C_3$, of the AND gates $G_0$ to $G_7$, the capacitance $(2C_0 + 2C_1 + C_2)$ of the basic selector 240 (since the inputs to the basic selectors 210, 220, and 230 are logic "0"s), the second stage capacitance $(C_0 + C_1 + C_2)$ (since the input to the basic selector 310 is a logic "0" and its power consumption is zero, so that the input to the basic selector 320 through the line 252 is zero), and the third stage capacitance $(C_0 + C_1 + C_2)$ (since the input to the basic selector 400 through the line 350 is a logic "0"). In other words, the total capacitance associated with the power consumption is:

$$8 \times C_3 + (2C_0 + 2C_1 + C_2) + (C_0 + C_1 + C_2) +$$
$$(C_0 + C_1 + C_2) = 8C_3 + 4C_0 + 4C_1 + 3C_2$$

therefore, the power consumption is given by:

$$f(8C_3 + 4C_0 + 4C_1 + 3C_2)V^2$$

This power consumption is greatly smaller than power consumption $f(14C_0 + 14C_1 + 7C_0) V^2$ of the conventional circuit.

What is claimed is:

1. A semiconductor integreated switching apparatus comprising: a space switch means for switching a highway signal; a control memory for controlling switching operation of said space switch means; an output control circuit for transmitting the highway signal selected by said space switch means; an expanding circuit connected with said output control circuit for expanding a capacity of said space switch means; an address comparator for reading out a written addresss signal which is written in said control memory upon writing the written address signal and comparing a readout address signal with the written address signal; and a maintenance reading control circuit for reading out from said comparator an operation status signal which represents an operation status of said space switch means; and said space switch means, said control memory, said output control circuit, said expanding circuit, said address comparator, and said maintenance reading circuit being integrated on a single substrate.

2. An apparatus according to claim 1, wherein said control memory comprises a plurality of memory elements respectively having write address signal terminals connected with corresponding write address lines thereof, read address signal terminals connected with corresponding read address lines, write data terminals connected with an input terminal for said written address signal, and read data terminals connected with said address comparator, and wherein when data is written in a given one of said plurality of memory elements through a corresponding one of said write data terminals, write and read addresses of said control memory are simultaneously accessed, the written data is read out from said given memory element through a corresponding one of said read data terminals, and said address comparator compares readout data with corresponding written data.

3. An apparatus according to claim 1, wherein said expanding circuit controls said output control circuit in response to an expanded address signal to expand an output highway terminal.

4. An apparatus according to claim 1 wherein said space switch means has a plurality of space switches, said apparatus further including a plurality of highway signal selectors which are inserted between an input terminal of highway signal and said plurality of switches, respectively, and a signal selection control circuit for supplying a selection switch signal to said plurality of highway signal selectors.

5. An apparatus according to claim 4, wherein each of said plurality of highway signal selectors includes a first selection stage having a plurality of complementary field effect transistors obtained by connecting sources and drains of p- and n-channel field effect transistors to each other, said first selection stage being adapted to select and output a half of the input signals which constitute the highway signal and are supplied to said sources of said plurality of complementary field effect transistors in response to a first selection signal commonly supplied to gates of said plurality of complementary field effect transistors from said highway signal selection control circuit as a part of selection switch signal, and a second selection stage having another plurality of complementary field effect transistors obtained by connecting sources and drains of p- and n-channel field effect transistors to each other, said second selection stage being adapted to select and output a quarter of the input signals supplied from said first selection stage to said sources of said another plurality of complementary field effect transistors in response to a second selection signal commonly supplied to gates of said another plurality of complementary field effect transistors from said highway signal selection control circuit as another part of the selection switch signal, said sources of said plurality of complementary field effect transistors being respectively connected to gate circuits to supply the input signals to input terminals of said gate circuits, and said highway signal selector being further provided with means for discriminating eliminated input signals in said second selection stage and a subsequent stage having another plurality of complementary field effect transistors on the basis of said second selection signal and a subsequency selection signal supplied from said highway signal selection control circuit to said subsequent stage as another part of the selection switch signal, and for supplying to said gate circuits a gate control signal for allowing gating of nonelminated input signals in said second and subsequent selection stages according to a discrimination result.

* * * * *

UNITED STATES PATENT AND TRADEMARK OFFICE
CERTIFICATE OF CORRECTION

PATENT NO. : 4,780,716
DATED : October 25, 1988
INVENTOR(S) : Kenichi MOTOHASHI et al It is certified that error appears in the above-identified patent and that said Letters Patent is hereby corrected as shown below:

COLUMN 6, LINE 66  Delete "$122_1$ 1 to $122_m$" and insert --$122_1$ to $122_m$--.

COLUMN 7, LINE 3   Delete "1 $123_m$" and insert --$123_m$--.

COLUMN 9, LINE 8   Delete "signal a1" and insert --signal a 1--.

COLUMN 9, LINE 36  Delete ":$fCV_2$" and insert --$fCV^2$--.

COLUMN 9, LINE 47  Delete "($14C_o 14C_1$" and insert --($14C_o + 14C_1$--.

Signed and Sealed this

Sixth Day of June, 1989

Attest:

DONALD J. QUIGG

Attesting Officer

Commissioner of Patents and Trademarks